May 4, 1965

A. B. ROSENSTEIN 3,182,245

SELF-SATURATING REACTOR SYSTEM

Filed Aug. 29, 1960

INVENTOR.
ALLEN B. ROSENSTEIN

BY

R.E. Geaugue

ATTORNEY

FIG. 6a — ZERO SIGNAL

FIG. 6b — POSITIVE SIGNAL

FIG. 6c — NEGATIVE SIGNAL

INVENTOR.
ALLEN B. ROSENSTEIN
BY R.E. Geangue
ATTORNEY

United States Patent Office 3,182,245
Patented May 4, 1965

3,182,245
SELF-SATURATING REACTOR SYSTEM
Allen B. Rosenstein, 3148 Barry Ave.,
West Los Angeles, Calif.
Filed Aug. 29, 1960, Ser. No. 52,693
12 Claims. (Cl. 321—16)

This invention relates to a shunt-loaded magnetic amplifier system employing self-saturating transformers and novel switching control elements therefor.

Many of the shortcomings of conventional magnetic amplifiers inherently arise from the fact that the saturable reactor is basically connected in series with the load. The reactor acts as a magnetic gate which subtracts a predetermined number of volt-seconds from each half-cycle of the alternating current source voltage, allowing the remainder to appear across the load. The output thus becomes the difference between the control volt-seconds set in the reactor core and what often is a randomly varying quantity such as the A.C. supply voltage. Because of the series form of connection, the magnetizing current of the reactors must flow through the load giving a quiescent load current. Also, the finite magnetizing current of its reactors makes it difficult or impossible for a magnetic amplifier of this type to work into an open circuit or very high resistance loads.

According to the present invention, a magnetically controlled, self-saturating transformer is developed employing the concept of a magnetic switch which will overcome the above-mentioned disadvantages. Novel switching control means, for cyclically turning the input winding or windings of the transformer on and off to vary the pulse width or notch width of the transformer's output also comprises one aspect of the invention.

The novel self-saturating transformer and switching control elements of the invention may be utilized for the conversion of D.-C. power to A.-C. power. In another embodiment of the invention the novel self-saturating reactor system of the invention may be utilized as a D.-C. transformer. The principles of the invention will be most clearly understood upon examining two embodiments of the D.C.-to-A.C. power conversion system and one embodiment of the D.C. transformer system. Each of these three embodiments employs a self-saturating transformer which has its input cyclically switched on and off thus providing a train of essentially rectangular pulses in the output winding. The energy content of these output pulses may be selectively varied by means of the apparatus of the invention. Two types of switching means are contemplated for turning the input winding on and off. The first of these employs a transistor switching circuit driven from a square wave source and the second means comprises a series saturable reactor with a highly constrained control winding driven from an A.-C. source.

Heretofore, electrical power conversion devices have generally employed electromechanical elements such as vibrators or motor generators. More recently, static elements have been employed and, in particular, transistors for switching the D.C. input to provide an alternating current for transformation. Although these solid-state or static devices are a considerable improvement over electromechanical devices, they have had certain shortcomings which cause them to be unsuitable and/or uneconomical for the conversion of D.-C. voltage at a given amplitude to D.-C. voltage at a lower voltage amplitude and a higher current as would be desirable for D.-C. converters. According to the present invention there is provided novel circuitry which is analagous to a theoretical D.-C. transformer. All solid-state elements are employed, the D.-C. output is continuously variable, and the efficiency is maintained at a high level at all output settings. The novel D.C.-to-A.C. inverter embodiment of the invention also makes possible continuous control over the output alternating current.

It is therefore, an object of the invention to provide a novel and improved self-saturating transformer system and switching control elements therefor to provide substantially rectangular pulse train outputs having selected energy content.

It is another object of the invention to provide novel and improved self-saturating reactor means useful in accomplishing pulse-width modulation.

It is another object of the invention to provide novel and improved self-saturating reactor means useful in controlling power levels by notch-width modulation techniques.

It is yet another object of the invention to provide a novel D.-C. to A.-C. inverter employing self-saturating reactor means and switching control means therefor.

Still another object of the invention is to provide a novel D.-C. transformer means employing a pulse-width modulator having self-saturating transformer means and a selectably variable switching control therefor.

These and other objects of the invention will be more readily understood after reviewing the following specification and drawings in which:

FIGURES 6a through 6e illustrate wave forms useful in describing the functioning of the invention.

Basic to the structure of the invention is a self-saturating transformer circuit having its power input derived from a switching element which is in turn driven from a source of cyclically recurring pulses. The switching element energizes the input winding of the self-saturating transformer by cyclically applying power having an amplitude sufficient to cause saturation of the core. This power-switching circuitry may have a variety of configurations and may, for example, employ either switching transistors or, alternatively, employ a series saturable reactor having a highly-constrained control winding; in either case a pulse source is used to drive the power-switching circuitry. Three power-conversion systems utilizing the invention will be shown and described below. Each of these three systems for utilizing the invention may employ either of the two embodiments of the self-saturating transformer switching control circuitry. The switching control circuit employing transistors, as shown schematically in FIGURE 1, will be described first.

Figure 1:
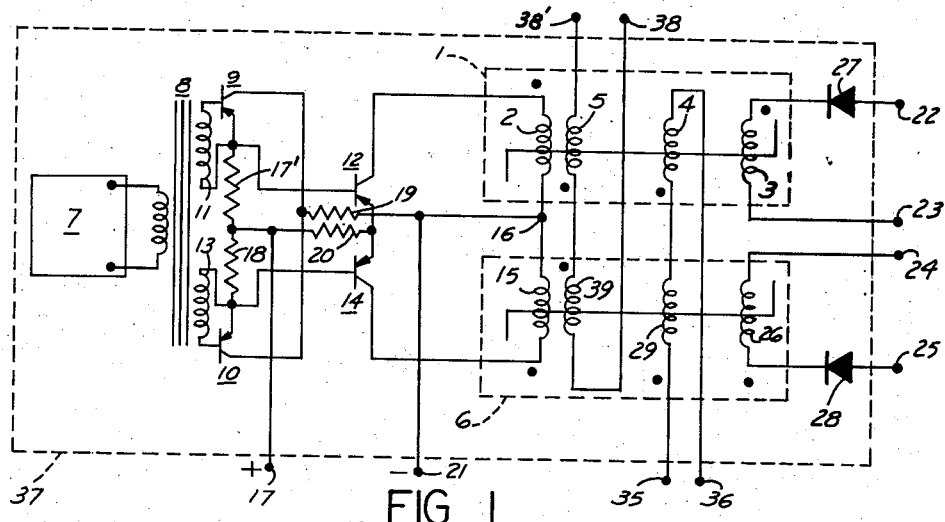
FIGURE 1 is a schematic diagram of a full-wave self-saturating transformer according to the invention and transistor switching control means therefor.

The self-saturating transformer 1 comprises four sets of windings; namely, input winding 2, output winding 3, control winding 4, and bias winding 5. The circuitry of FIGURE 1 is a full-wave configuration; accordingly a second identical self-saturating transformer 6 is interconnected with transformer 1. It should be understood, however, that the invention need not be limited to full-wave circuits. A high-frequency source 7, which may be an oscillator of any suitable and well-known construction is transformer-coupled via transformer 8 to transistor amplifiers 9 and 10. Winding 11 is connected between the base and emitter of transistor 9, which in turn is connected in cascaded relationship with transistor 12 and input winding 2.

Similarly, winding 13 is connected between the base and emitter of transistor 10, cascaded to transistor 14 and input winding 15. D.C. power is applied to the common terminal 16 of input windings 2 and 15. The positive terminal 17 of the D.C. supply is returned to the emitters of transistors 9–10 and 12–14 via current limiting resistors 17'–20.

The signal from source 7, which, for example, may be a sine wave, is amplified by transistor amplifiers 9–10 and is used to control switching transistors 12 and 14 which in turn alternately switch power from the D.C. supply appearing at terminals 17 and 21 to input winding 2 and 15 of saturating transformers 1 and 6. Transistors 12 and 14 are used as switching transistors in that one is always switched all the way on whereas the other is switched all the way off; thus a square wave of voltage is alternately applied to input winding 2 of transformer 1, and input winding 15 of transformer 6. Assuming that voltage is applied to winding 2 while winding 15 is quiescent (viz, transistor 14 is switched off), the voltage applied to winding 2 of transformer 1 will be transformed to the output winding 3 of transformer 1. This voltage, appearing at output winding 3 will be applied through leads 22 and 23 to the related circuitry. Similarly, on alternate half cycles of the signal from high-frequency source 7, transistor 12 will be switched off and voltage will be applied to winding 15 and an output voltage will appear at terminals 24 and 25 of winding 26. The function of series diodes 27 and 28 will become apparent in the discussion of the utilization of the output signals from transformers 1 and 6, which follows.

Figure 2:
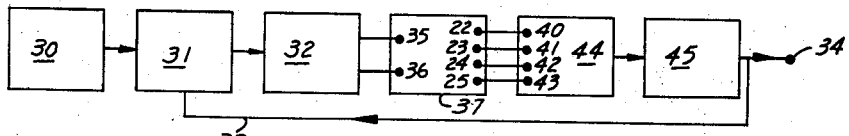
FIGURE 2 is a block diagram of a D.-C. to A.-C. inverter system according to the invention.

There is shown in FIGURE 2 a block diagram of a D.C. to A.C. inverter system employing notch-width control and utilizing the self-saturating transformer circuitry of the invention. A frequency standard 30, which may be a sine-wave oscillator of any suitable and well-known construction, is used to provide a sine-wave to one input of a difference amplifier 31. Amplifier 31 may be any suitable construction of the type which produces as an output a signal corresponding to the difference between two input signals. The frequency of standard 30 is selected to be the same as the desired output frequency of the system appearing at terminal 34. It should be understood, however, that the signal from standard 30 need not be a sine wave but may be of any wave shape which is desired to be reproduced at the output 34. The alternate input to difference amplifier 31 is obtained from the system output appearing at terminal 34 and is supplied via line 33. The difference between the standard 30 and the system output 34 comprises an A.C. control signal which is applied to amplifier 32; this in turn supplies control signals to series-connected control windings 4 and of the self-saturating transformers (1 and 6) of FIGURE 1. A fixed D.C. bias reference is connected to bias windings 5 and 39 via terminals 38 and 38' of FIGURE 1. This bias will adjust the operating point of the self-saturating transformers to their quiescent condition. The voltage applied to control windings 4 and 29 being A.C. will swing the saturating transformers on either side of the quiescent bias.

The output from power amplifier 32 is supplied to the control windings via terminals 35 and 36 of the self-saturating transformer circuitry of FIGURE 1.

The output from the self-saturating transformer circuitry comprises a pair of essentially rectangular pulse trains; the notch width between each pulse of these pulse trains is determined by the control signal supplied from power amplifier 32. As will be obvious to one skilled in the art, the output pulse train may be of the form of a series of sections or "slices" of a sine wave, assuming that the wave form of the output from source 30 is a sine wave, in which case the pulses will be rectangular in form except for the top portion thereof. For this reason they will be referred to and/or considered as essentially rectangular pulses. The input from terminals 22 through 25 of the self-saturating transformer circuitry 37 is supplied to terminals 40–43, respectively, of the apparatus of FIGURE 5. Diodes 27 and 28 permit pulses of only a given polarity to pass from each output winding 3 and 26. Thus, the spacing or notch between alternate positive and negative pulses may be controlled. The notch-width controlled rectangular pulses appearing at terminals 40–43 are supplied to the inputs of the emitter followers 46 and 47. Transistors 46 and 47 are emitter followers cascaded into transistors 48 and 49 thereby comprising two-stage amplifiers. The emitters of transistors 48 and 49 are connected to the positive power supply terminal 17 through resistor 50. The collectors of transistors 46 and 47 are returned to the negative supply terminal 21 via resistor 51. The outputs of the two-stage amplifiers drive the input windings 52 and 53 of transformer 54.

Figure 6D:
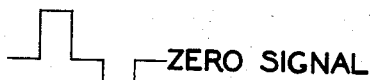
Figure 6D:
Figure 6D:
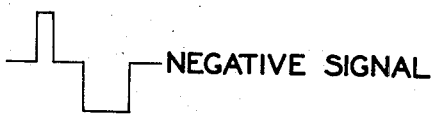
Figure 6D:
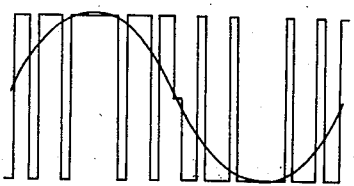

Alternatively, a source having a frequency corresponding to the desired A.-C. output frequency of the system appearing at terminal 34 may be substituted for the high frequency source used to drive the saturating transformers of the previously described embodiment. Regulation of the A.-C. output amplitude is accomplished by rectifying the A.-C. output voltage appearing at terminal 34 of FIGURE 7 via rectifier 114 and supplying the rectified D.-C. on line 118 to one input of difference amplifier 116. The alternate input to the difference amplifier 116 is derived from a fixed D.-C. source 115. The output from the difference amplifier 116 will then be a D.-C. voltage representing the difference between the rectified system output and the fixed D.-C. reference voltage. The difference voltage is amplified via amplifier 117 and supplied to control winding terminals 35 and 36 (or 35A and 36A) of block 37; being a D.-C. voltage, it will establish the point in time at which the transformer cores will saturate. As in the case of the system of FIGURE 2, block 37, may be replaced by block 100; these saturating transformer circuits being directly interchangeable. An increase in the D.-C. voltage from amplifier 117 will cause the cores to saturate sooner; conversely, a decrease in the D.-C. control voltage will retard the saturation of the cores. In this way, the spacing between successive half cycles may be varied by the closed-loop system in order to regulate the A.-C. output amplitude. In the D.-C. control loop embodiment of FIGURE 7 the pulses supplied to filter 45 change symmetrically, as shown in FIGURE 6d. As can be seen, this inverter system embodiment is similar to that of FIGURE 2 except that the output frequency is established by source 7 or source 90 rather than a separate frequency reference (30) and the control loop (118) carries direct current rather than alternating current. It will now be obvious that the novel saturating transformers of the apparatus of either FIGURE 1 or FIGURE 3 may be controlled by either an A.-C. input signal applied to control winding terminals 35 and 36 (or 35A and 36A) as in the case of the embodiment of FIGURE 2 or may be controlled by a D.-C. input signal as in the case of the embodiment of FIGURE 7. No structural differences are required between block 37 of FIGURE 2 and block 37 of FIGURE 7, the difference residing in the related circuitry.

Figure 5:
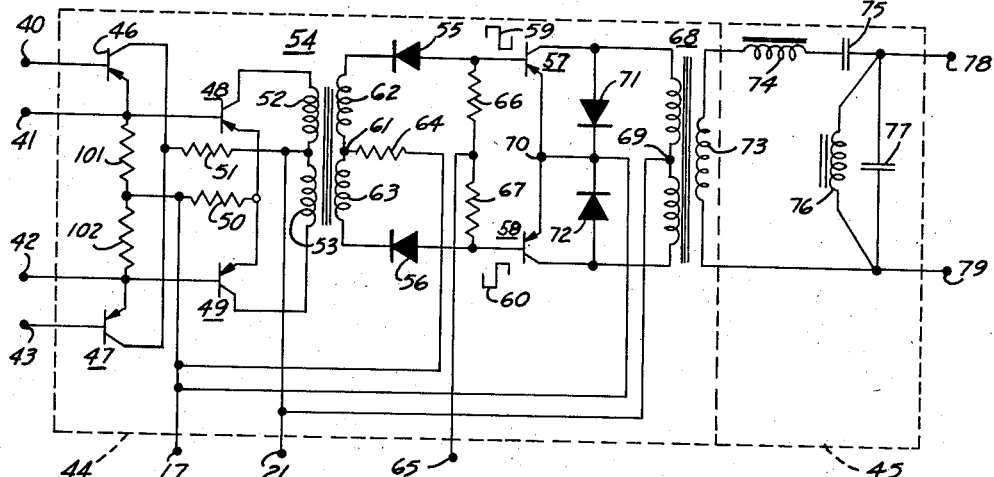
FIGURE 5 is a schematic diagram of the power transistor output circuit and the output filter of the apparatus of FIGURE 2 and FIGURE 7.

Blocks 44 and 45 shown in FIGURES 2, 5 and 7 will now be discussed.

Since the amplified signal supplied to the input (40–43) are large-amplitude rectangular pulses, transistors 48 and 49 will act as switches. Transistor switch 48 will open while transistor switch 49 closes; and, therefore, the voltage will be applied to first one input winding (52) and then the other (53) of transformer 54.

The output, in the form of essentially rectangular pulses 59 and 60, from transformer 54 is coupled through diodes 55 and 56 to power transistors 57 and 58. The center tap 61 joining output windings 62 and 63 of transformer 54 is connected to the positive terminal 17 of the D.-C. supply via current limiting resistor 64. A positive bias potential is applied to the circuit via terminal 65 at the junction between resistors 66 and 67.

The output of power transistors 57 and 58 is coupled to output transformer 68. The negative terminal of the D.-C. supply is connected to the input winding center tap 69; the negative terminal 21 of the D.-C. supply is connected to the common junction 70 between the emitters of power transistors 57 and 58. Protective diodes 71 and 72 may be shunted across the emitter and collectors of each of the power transistors 57 and 58 for the purpose of suppressing inverse transients.

The output winding 73 of transformer 68 may be connected to a low-pass A.-C. filter 45 tuned to pass the desired A.-C. output frequency. This filter is comprised of a series inductance 74, a series capacitance 75, a shunt inductance 76 and a shunt capacitance 77. Such a filter may be employed to remove the high-frequency components from the rectangular output waves and thereby provide essentially sine wave output power. The output power is available in terminals 78 and 79.

Referring again to the circuitry of FIGURE 1, transformers 1 and 6 saturate each half cycle. The saturation point is determined by the voltage applied to control windings 4 and 29. In the quiescent state, both transformers are saturated at the same time. The application of voltage to the control via terminals 35 and 36 will cause one transformer to saturate earlier, and the other later, in each half cycle. The output waveform in the quiescent state is shown in FIGURE 6a. If a positive voltage is applied to the control windings, the width of the positive-going pulse will increase as shown in FIGURE 6b. If a negative voltage is applied to the control windings, the width of the negative-going pulse will increase as shown in FIGURE 6c. Inasmuch as the output waveforms from transformers 1 and 6 ultimately control power transistors 57 and 58, the amplitude of the output power appearing at the secondary 53 of transformer 68 is regulated by the control voltage applied to windings 4 and 29.

Figure 7:
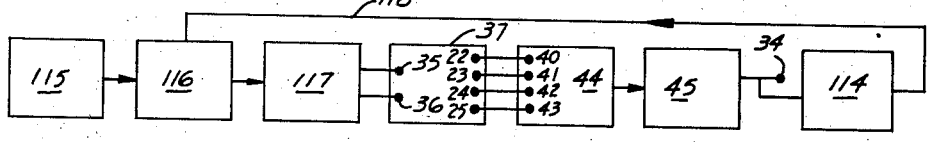
FIGURE 7 is a block diagram of an alternative embodiment of a D.-C. to A.-C. inverter system according to the invention employing notch-width regulation of the A.-C. output.
Figure 3:
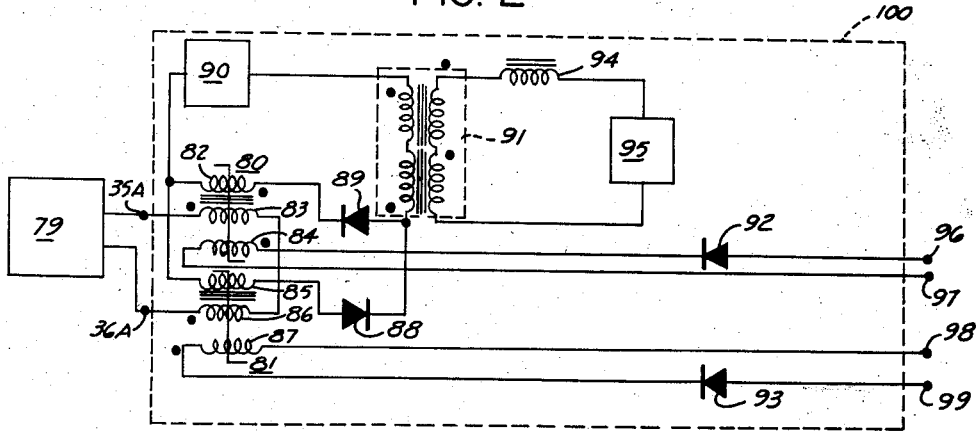
FIGURE 3 is a schematic diagram of an alternative embodiment of the self-saturating transformer and switching control circuit in which a series saturable reactor with a highly-constrained control winding and a high-frequency A.-C. source is employed.

FIGURE 3 is the alternate embodiment of the self-saturating transformer and switching control circuit which can be used in conjunction with the D.-C. to A.-C. inverter systems of FIGURES 2 and 7. It should be understood that the apparatus of FIGURE 3 is functionally equivalent to the apparatus of FIGURE 1 and may be substituted therefor in the systems of FIGURES 2 and 7 in which case terminals 35, 36, 22–25 of FIGURE 1 would be substituted for terminals 35A, 36A, 96–99 respectively, of FIGURE 3. The output appearing at terminals 96–99 of FIGURE 3 will be of exactly the same form as the output appearing at terminals 22–25 of FIGURE 1. The function of saturating transformers 80 and 81 is identical with that of transformers 1 and 6 of FIGURE 1.

Figure 6E:
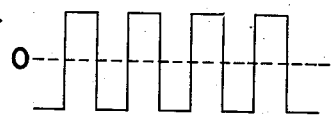

Referring now to FIGURE 3 the output of high-frequency sine-wave source 90 is modified into a constant-current square-wave signal as shown in FIGURE 6e by series connected reactors 91 having a highly constrained control source comprising series inductance 94 and D.-C. source 95. The square waves of current are applied to the input windings 82 and 85 of saturating transformers 80 and 81 alternately through the diodes 89 and 88. Because of the oppositely polarized connection of diodes 88 and 89, the square waves of current are alternately applied to windings 82 and 85. The pulse width transmitted to output windings 84 and 87 of saturating transformers 80 and 81 will, as in the case of the apparatus of FIGURE 1 depend upon the control voltage applied to the series connected control windings 83 and 86 via terminals 35A and 36A. In the apparatus of either FIGURE 1 or FIGURE 3, it is the purpose of the switching control element to switch square waves of relatively constant current to the self-saturating transformer in the proper sequence.

Figure 4:
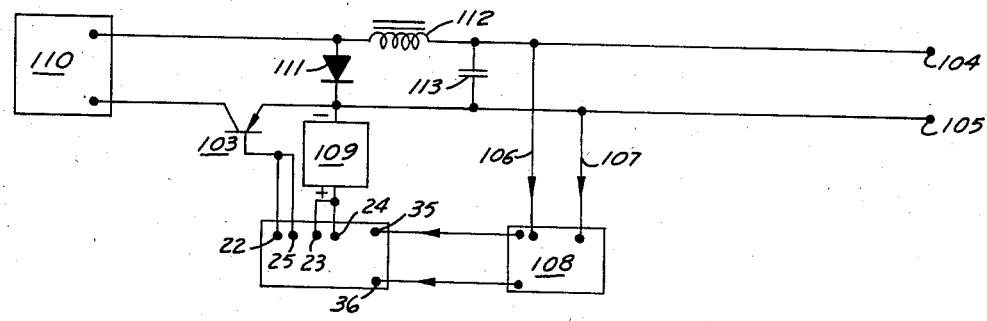
FIGURE 4 is a schematic diagram, partially in block form, of a D.-C. transformer system employing the self-saturating transformer system of the invention.

There is shown in FIGURE 4 a system utilizing the apparatus of the invention for transforming unregulated D.-C. with minimal power loss. Terminals 35, 36, 22–25 of FIGURE 1 or terminals 35A, 36A, 96–99 of FIGURE 3 are connected as shown in FIGURE 4.

Unregulated D.-C. power is controlled by switching transistor 103. Switch transistor 103 is in turn controlled by the self-saturating transformer and switch control circuitry of FIGURE 1 or FIGURE 3. The self-saturating transformer circuit sends a series of pulse-width modulated voltages to power transistor 103 for turning it on. A D.-C. bias from bias supply 109 turns off transistor 103 in the absence of a pulse from the saturating transformers. In the event that the regulated output voltage appearing at terminals 104 and 105 falls to a lower level than is desired, then the pulses switching on the power transistor 9 would increase in duration (width) and the off time would decrease. The sum of the on and off times is a constant interval as shown in FIGURES 6a–6c. If increased output voltage is desired at terminals 104 and 105, the on time interval is increased (see FIGURE 6b) at the expense of the off-time interval. The output voltage appearing at terminals 104 and 105 is supplied through leads 106 and 107 to the reference and difference amplifier 108. The output voltage on leads 106 and 107 is compared against a suitable fixed voltage reference, such as a Zener diode; the difference between the output on leads 106 and 107 and the fixed voltage reference is then amplified and supplied to terminals 35 and 36 (or 35A and 36A). Terminals 38' and 38 of FIGURE 1 are not utilized in the apparatus of FIGURE 4. Bias windings 5 and 39 need not necessarily be used in the apparatus of FIGURE 4; if they should be employed, they would just be used as a fixed reference bias. Control windings 4 and 29 of FIGURE 1 are controlled by the output from difference amplifier 108 of FIGURE 4. By varying the current through control windings 4 and 29, it is possible to control the pulse width of the voltages appearing on the output terminals 22–23, and 24–25. The bias voltage supply 109 biases the power transistor 103 to a non-conducting condition. Power transistor 103 will only conduct current when a positive pulse is derived from either 22–23 or 24–25. The width of these positive pulses is again controlled by saturable transformers 1 and 6 (or 80 and 81).

The output derived from the connection shown of terminals 22–25 is that of a full-wave rectifier. If the high-frequency source (7 or 90) is, for example, two thousand cycles per second, then power transistor 103 will receive twice this many pulses, or four thousand cycles per second. This provides advantageous frequency doubling. It will, however, be obvious to one skilled-in-the-art that a similar function could be obtained with one self-saturating transformer and one switching transistor in a half-wave circuit embodiment.

The circuit function described thus far has been directed to the control action and the control loop. The D.C. transformer action is derived as follows: The unregulated D.C. from source 110 is passed through power transistor 103 as a series of pulse-width modulated pulses. This interrupted D.C. is applied to series inductance 112, which in conjunction with shunt capacitor 113 provides the necessary smoothing to give a well-filtered and regulated D.C. at output terminals 104 and 105. The function of the diode 111 is important for efficient action of the D.C. transformer. During the conducting period of power transistor 103, energy will be stored in the magnetic field of the filter inductance 112. During the non-conducting period of power transistor 103, the energy in the filter inductance 112 must be transferred in some way. As the magnetic field of inductance 112 starts to collapse, a voltage is induced across the terminals of the filter inductance 112 in such a polarity as to cause diode 111 to conduct. The energy stored in inductance 112 is consequently transferred to capacitors 113 instead of being dissipated across the power transistor 103. As a result, the stored energy is available at the output 104–105 and the efficiency of the system is very high. The losses are extremely low and it is possible to get true transformer action without using an intermediate A.-C. system having a step-down transformer.

There has been shown and described a novel self-saturating reactor system in which the energy content of a train of rectangular output pulses is controlled by cyclically switching the self-saturating transformer of the system on and off. It will be obvious to those skilled in the art that various modifications may be made without departing from the basic principles of the invention. For example, the output windings 3 and 26 (or 84 and 87) may be eliminated and the load shunt connected across the primary windings 2 and 15 (or 82 and 85) in the manner of the well known autotransformer. Also, the various amplification stages and smoothing filter circuits included in the embodiments shown and described may be omitted in those instances where their inclusion is non-essential. Furthermore, it should be understood that certain current-limiting resistors, protective elements, etc. shown in the preferred embodiments may be deleted if not required in specific applications.

Therefore, while particular embodiments of the present invention have been shown and described, the aim in the appended claims is to cover all such changes and modifications as fall within the true spirit and scope of this invention.

What is claimed is:

1. Pulse-width control apparatus comprising a self-saturating transformer having an input winding and a control winding, a source of power connected to said input winding a load coupled to said input winding for obtaining power therefrom, switching means connected with said input winding for cyclically applying power thereto to produce substantially rectangular pulses across said load, and terminal means connected to said control winding for imparting a control signal to said control winding, the magnitude of which determines the width of said pulses.

2. Pulse-width control apparatus as defined in claim 1 wherein said switching means comprises a transistor, a source of high frequency pulses connected with said transistor, said source being adapted to cyclically cause said transistor to conduct.

3. Pulse-width control apparatus as defined in claim 1 wherein said switching means comprises a source of high frequency pulses, a saturable reactor in series with said source and said input winding, said reactor having a highly constrained control winding whereby said reactor converts the output of said high-frequency source into a train of constant-current rectangular pulses.

4. Pulse-width control apparatus comprising a self-saturating transformer having an input winding, a control winding and an output winding, switching means connected with said input winding for cyclically applying power thereto to produce substantially rectangular pulses from said output winding, and terminal means connected to said control winding for imparting a control signal to said control winding, the magnitude of which determines the width of said output pulses.

5. A pulse-width control device comprising a pair of self-saturating transformers each having an input winding and a control winding, said control windings being interconnected to permit common control, a load coupled to said input windings for obtaining power therefrom, switching means connected with the input windings of each of said transformers for alternately applying power thereto to produce a series of substantially rectangular pulses across said load, and terminal means connected to said control windings for imparting to said control windings a control signal the magnitude of which controls the width of said pulses.

6. A pulse-width control device comprising a pair of self-saturating transformers each having an input winding, a control winding and an output winding, said control windings of said transformers being connected in series, switching means connected with the input winding of each of said transformers for alternately applying power thereto to produce a series of substantially rectangular pulses from said output windings, and terminal means connected to said control windings for imparting to said control windings a control signal the magnitude of which controls the width of said pulses.

7. A system for converting direct current to regulated alternating current comprising, a source of direct current, a self-saturating transformer having an input winding and a control winding, a load coupled to said input winding for obtaining alternating current power therefrom, switching means connected to said input winding for cyclically applying voltage from said direct current source thereto, a source of fixed-frequency alternating current for controlling the cyclic rate of said switching means, difference amplifier means having a first input, and a second input, said first input being adapted to receive alternating current from said source of fixed-frequency alternating current, said second input being adapted to receive alternating current from said load, said difference amplifier being adapted to provide a difference signal to said control winding representing the difference between said alternating currents thereby controlling the amplitude of the alternating current appearing across said load.

8. A system for converting direct current to regulated alternating current comprising, a source of direct current, a self-saturating transformer having an input winding, a control winding and an output winding, switching means connecting with said input winding for cyclically applying voltage thereto from said direct currrent source and thereby produce a train of substantially rectangular pulses from said output winding, a source of fixed-frequency alternating current for controlling the switching frequency of said switching means, difference amplifier means having a first input and a second input, said first input being adapted to receive alternating current from said source of fixed-frequency alternating current, said second input being adapted to receive alternating current from the output of said system, said difference amplifier being adapted to provide a difference signal to said control winding representing the difference between said alternating currents thereby controlling the width of said pulses from said output winding, power amplifier means connected with said output winding for amplifying said pulses, and filter means for shaping said pulses to sine-wave alternating current.

9. A system for converting direct current to regulated alternating current comprising, a source of direct current, a self-saturating transformer having an input winding and a control winding, a load coupled to said input winding for obtaining substantially rectangular pulses therefrom, switching means connected with said input winding for cyclically applying voltage from said direct current source to said input winding, rectifier means coupled to said load for providing a D.C. control signal the magnitude of which is proportional to the magnitude of said pulses appearing across said load, a fixed D.C. reference, difference amplifier means having a first input, and a second input, said first input being adapted to receive voltage from said fixed D.C. reference, said second input being adapted to receive said D.C. control signal, said difference amplifier being adapted to provide a D.C. difference voltage to said control winding representing the difference between said fixed D.C. reference and said D.C. control signal thereby controlling the width of the pulses appearing across said load.

10. Pulse-width control apparatus comprising a self-saturating transformer having an input winding, a control winding, and an output winding, a source of power, a load connected across said output winding for obtaining power therefrom, switching means connected in series with said input winding and with said source of power for cyclically applying power to said input winding to produce substantially rectangular pulses in said output winding, and terminal means connected to said control winding for imparting a control signal to said control winding, the magnitude of which determines the width of said pulses.

11. Pulse-width control apparatus as defined in claim 10 wherein said source of power comprises a direct current power supply.

12. Pulse-width control apparatus as defined in claim 10 wherein said source of power comprises an alternating current power supply.

References Cited by the Examiner
UNITED STATES PATENTS

| | | | |
|---|---|---|---|
| 2,751,549 | 6/56 | Chase | 323—22 |
| 2,809,303 | 10/57 | Collins | 307—88 |
| 2,832,034 | 4/58 | Lilienstein et al. | 323—22 |
| 2,959,725 | 11/60 | Younkin | 321—18 |
| 2,959,726 | 11/60 | Jensen | 321—18 |
| 3,040,234 | 6/62 | Walker | 321—45 |

RALPH D. BLAKESLEE, *Acting Primary Examiner.*

SAMUEL BERNSTEIN, ROBERT C. SIMS, *Examiners.*